United States Patent [19]

Abe et al.

[11] Patent Number: 5,587,427
[45] Date of Patent: Dec. 24, 1996

[54] RESIN COMPOSITION AND PROCESS FOR PRODUCING SAME

[75] Inventors: Hiroomi Abe, Chiba; Kenji Nagaoka; Takashi Sanada, both of Ichihara, all of Japan

[73] Assignee: Sumitomo Chemical Company, Limited, Osaka, Japan

[21] Appl. No.: 459,677

[22] Filed: Jun. 2, 1995

Related U.S. Application Data

[62] Division of Ser. No. 248,559, May 24, 1994, abandoned, which is a continuation of Ser. No. 131,916, Oct. 4, 1993, abandoned, which is a continuation of Ser. No. 623,501, Dec. 7, 1990, abandoned.

[30] Foreign Application Priority Data

Dec. 11, 1989 [JP] Japan ................................. 1-321148
Dec. 25, 1989 [JP] Japan ................................. 1-332959
Dec. 25, 1989 [JP] Japan ................................. 1-332960

[51] Int. Cl.$^6$ ........................................... C08F 8/00
[52] U.S. Cl. ........................... 525/145; 525/397; 525/535; 525/905
[58] Field of Search ..................... 524/252, 254; 525/145, 397, 535, 905

[56] References Cited

U.S. PATENT DOCUMENTS 3,862,265  1/1975  Steinkamp et al. ..................... 525/285
4,116,529  3/1979  Yamamoto et al. ..................... 524/262
4,914,153  4/1990  Togo et al. .............................. 525/68

FOREIGN PATENT DOCUMENTS 0189553  8/1986  European Pat. Off. .
0336780  10/1989  European Pat. Off. .
2315519  1/1977  France .
1494167  2/1969  Germany .
1494287  2/1970  Germany .

*Primary Examiner*—Mark D. Sweet
*Attorney, Agent, or Firm*—Watson Cole Stevens Davis P.L.L.C.

[57] ABSTRACT

A resin composition prepared by melting and kneading (A) a thermoplastic resin comprising a polyolefin resin together with (B) a functional compound having one or more bond(s) or one or more functional group(s) selected from the group consisting of non-aromatic carbon-carbon multiple bonds, oxirane groups and substituted carboxyl groups, and subsequently mixing thereinto (C) a polar compound having in one molecule one or more polar group(s) selected from the group consisting of substituted carboxyl groups, substituted hydroxyl groups, substituted amino groups, substituted mercapto groups, substituted sulfonic acid groups, oxazoline groups, isocyanato groups and oxirane groups, provided that at least one of the polar groups of (C) is different from at least one of the functional groups of the functional compound (B), as well as a process for producing said resin composition.

9 Claims, No Drawings

RESIN COMPOSITION AND PROCESS FOR PRODUCING SAME

This is a division of application Ser. No. 08/248,559, filed May 24, 1994, now abandoned; which in turn is a continuation of application Ser. No. 08/131,916, filed Oct. 4, 1993, now abandoned; which in turn is a continuation of application Ser. No. 07/623,501, filed Dec. 7, 1990, now abandoned.

BACKGROUND OF THE INVENTION

This invention relates to a resin composition and a process for producing it, and more particularly to a polyolefin type resin composition enhanced in impact resistance while retaining its characteristic properties such as stiffness, etc. and a process for producing the resin composition.

Description of the Prior Art

Polyolefin resins and particularly crystalline polyolefin resins are characterized by their low density and inexpensiveness. in addition to their excellency in stiffness, electrical properties, solvent resistance, moldability, processability, etc., owing to which they are widely used as various molded articles and films.

However, such polyolefin resins have some faults, and their improvements is waited for. One of the faults is their inferiority in impact resistance, and a variety of methods for overcoming these faults have been proposed up to today. However, the methods and compositions hitherto proposed are disadvantageous in various points, and none of them is satisfactory from the industrial point of view. That is, although blending of an elastomer into a polyolefin and modification of a polyolefin by polymerization have been proposed hitherto with the aim of improving impact resistance, a practically improved impact resistance can be acquired only by incorporating a considerably large quantity of elastomer component into polyolefin, which inevitably results in deterioration of the original excellent properties of polyolefin resin such as stiffness, heat distortion resistance, etc.

In case of compositions comprising a polyolefin resin and other thermoplastic resin, a resin composition excellent in compatibility is generally difficult to obtain because of the low affinity between polyolefin resin and other thermoplastic resin, and it is yet impossible at the present stage to prepare a resin composition comprising a polyolefin resin and other thermoplastic resin having so excellent properties as to be fit for practical uses, in spite of the many proposals. There have been made various proposals regarding improvement of compatibility in the compositions comprising a polyolefin resin and other thermoplastic resin. For example, regarding the compositions comprising a polyolefin resin and a polyphenylene ether resin, a resin composition comprising an acid-modified polyolefin resin and a polyphenylene ether resin [Japanese Patent Application Kokai (Laid-Open) No. 60-120748], a resin composition comprising a modified polyolefin resin, a modified polyphenylene ether resin and a binder (Japanese Patent Application Kokai (Laid-Open) No. 63-128056), a resin composition prepared by compounding an amino group-containing modified polyolefin resin, a polar group-containing modified polyphenylene ether resin, a polyolefin resin, a polyphenylene ether resin and the like [Japanese Patent Application Kokai (Laid-Open) No. 2-173137], etc. have been proposed. However, these proposed resin compositions are insufficient in compatibility and unsatisfactory in mechanical properties and particularly impact resistance, though they are improved in solvent resistance, moldability, etc.

On the other hand, regarding the improvement of resin compositions comprising a polyolefin resin and a polyarylene sulfide resin, a resin composition comprising an olefin copolymer and polyphenylene sulfide [Japanese Patent Application Kokai (Laid-Open) No. 58-154757], a resin composition comprising a modified polyolefin, polyphenylene sulfide and an epoxy resin [Japanese Patent Application Kokai (Laid-Open) No. 59-207921], etc. have been proposed. Regarding the improvement of resin compositions comprising a polyolefin resin and a polystyrene resin, a resin composition containing a hydrogenated block copolymer as a third component [Japanese Patent Applicatin Kokoku (Post-Exam.) No. 62-34782, Japanese Patent Application Kokai (Laid-Open) No. 1-174550], etc. have been proposed. However, these proposed resin compositions are yet insufficient in impact resistance.

SUMMARY OF THE INVENTION

It is an object of this invention to provide a polyolefin resin composition comprising a polyolefin resin as a main resin ingredient and having a high stiffness and a high impact strength simultaneously, and a process for producing said polyolefin resin composition. It is another object of this invention to provide a resin composition comprising a polyolefin resin and other thermoplastic resin as its main resin ingredients and excellent in mechanical properties, particularly impact resistance, and a process for producing said resin composition.

With the aim of achieving the objects mentioned above, the present inventors conducted many studies to find a surprising fact that, when two kinds of specified organic compounds are made to act upon a polyolefin resin in a specified order, impact strength of the polyolefin resin can be improved to a remarkable extent without deteriorating the excellent properties which polyolefin resins originally have, such as high stiffness, etc. and a fact that, when two kinds of specified organic compounds are similarly made to act upon a mixture consisting of a polyolefin resin and other thermoplastic resin in a specified order, there can be obtained a resin composition remarkably higher in compatibility than in the above cases of Japanese Patent Application Kokai (Laid-Open) No. 63-128056 and Japanese Patent Application Kokai (Laid-Open) No. 2-173137 where a polyolefin resin and other thermoplastic resin were separately modified. Based on these findings, this invention was accomplished.

Thus, this invention provides a resin composition prepared by melting and kneading (A) a thermoplastic resin comprising a polyolefin resin and optionally other thermoplastic resin and optionally an elastomer together with (B) a functional compound having one or more bonds or one or more functional groups selected from the group consisting of non-aromatic carbon-carbon multiple bonds, oxirane groups and substituted carboxyl groups and thereafter mixing thereinto (C) a polar compound having, in one molecule, one or more polar groups selected from the group consisting of substituted carboxyl groups, substituted hydroxyl groups, substituted amino groups, substituted mercapto groups, substituted sulfonic acid groups, oxazoline groups, isocyanato groups and oxirane groups, provided that at least one of polar groups of (C) differs from at least one of functional groups of the polar compound (B). This invention further provides a process for producing a resin composition which comprises melting and kneading (A) a thermoplastic resin comprising a polyolefin resin and optionally other thermoplastic resin and optionally an elastomer together with (B) a functional compound having one or more bonds or one or more functional groups selected from the group consisting of non-aromatic carbon-carbon multiple bonds, oxirane groups and substituted carboxyl groups and thereafter mixing thereinto (C) a polar compound having, in one molecule, one or more polar groups selected from the group consisting of substituted carboxyl groups, substituted hydroxyl groups, substituted amino groups, substituted mercapto groups, substituted sulfonic acid groups, oxazoline groups, isocyanato groups and oxirane groups, provided that at least one of the polar groups of (C) differs from at least one of the functional groups of the polar compound (B).

DETAILED DESCRIPTION OF THE INVENTION

The thermoplastic resin (A) of this invention is a thermoplastic resin comprising at least one polyolefin resin as its indispensable ingredient.

As used herein, the term "polyolefin resin" inclusively means homopolymers and copolymers of olefins including α-olefins such as ethylene, propylene, butene-1, pentene-1, hexene-1, 3-methylbutene-1, 4-methylpentene-1, octene-1, decene-1, dodecene-1, tetradecene-1, hexadecene-1, octadecene-1, eicosene-1 and the like, cyclic olefins mentioned in Japanese Patent Application Kokai (Laid-Open) No. 2-115248, and the like. Copolymers prepared by copolymerizing an olefin with a small quantity of other unsaturated monomer, and modified products of said copolymers and the above-mentioned olefin homopolymers and copolymers prepared by oxidation, halogenation, sulfonation and the like of polymer are also included in the polyolefin resin of this invention.

Examples of the above-mentioned unsaturated monomer copolymerizable with an olefin include unsaturated organic acids and their derivatives such as acrylic acid, methacrylic acid, maleic acid, itaconic acid, methyl acrylate, methyl methacrylate, maleic anhydride, arylmaleic acid imide, alkylmaleic acid imide and the like; vinyl esters such as vinyl acetate, vinyl butyrate and the like; aromatic vinyl compounds such as styrene, methylstyrene and the like; vinylsilanes such as vinyltrimethylmethoxysilane, γ-methacryloyloxypropyltrimethoxysilane and the like; non-conjugated dienes such as dicyclopentadiene, 4-ethylidene-2-norbornene, 4-methyl-1,4-hexadiene, 5-methyl-1,4-hexadiene and the like; etc. Among the polyolefins mentioned above, copolymers of which 50% by weight or more is constituted of ethylene, propylene, butene-1, 3-methylbutene-1 or 4-methylpentene-1 and homopolymers of these monomers are preferable, and crystalline propylene type polymers such as propylene homopolymer, propyleneethylene block or random copolymer and the like are more preferable.

Although molecular weight range of the polyolefin resin cannot be simply specified because desirable molecular weight varies with the purpose, the molecular weight is usually in the range of 0.01 to 400 g/10 minutes and preferably 0.15 to 60 g/10 minutes, as expressed in terms of melt flow rate (MFR) measured at a temperature of 230° C. under a load of 2.16 kg/cm².

The above-mentioned polyolefin resin can be produced by hitherto known methods such as polymerization or modification. Commercial products are also extensively available, and they can also be used after an appropriate selection.

If desired, the thermoplastic resin (A) can comprise other thermoplastic resin in addition to the polyolefin resin. Examples of said other thermoplastic resin include polyphenylene ether resin, polyarylene sulfide resin, polysulfone resin, polyketone resin, polyester resin, polystyrene resin, polycarbonate resin and the like.

As used herein, the term "polyphenylene ether resin" means a polymer constituted of a recurring unit represented by the following general formula:

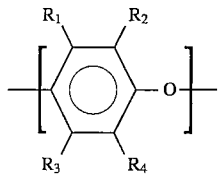

wherein $R_1$, $R_2$, $R_3$ and $R_4$ each represents identical or different group selected from the group consisting of hydrogen atom, halogen atom, hydrocarbon group, substituted hydrocarbon group, hydrocarbon-oxy group and substituted hydrocarbon-oxy group. Examples of the substituent in the substituted hydrocarbon group and substituted hydrocarbon-oxy group include thermally stable groups such as halogen atom, hydroxyl group, amino group, nitro group, cyano group, carboxyl group, amido group, ether group, sulfide group, sulfon group and the like. Concrete examples of said polyphenylene ether resin include poly(2,6-dimethyl-1,4-phenylene ether), poly(2,6-diethyl-1,4-phenylene ether), poly(2-methyl-6-ethyl-1,4-phenylene ether), poly(2-methyl-6-propyl-1,4-phenylene ether), poly(2,6-dipropyl-1,4-phenylene ether), poly(2-ethyl-6-propyl-1,4-phenylene ether), poly(2,6-dibutyl-1,4-phenylene ether), poly(2,6-dipropylene-1,4-phenylene ether), poly(2,6-dilauryl-1,4-phenylene ether), poly(2,6-diphenyl-1,4-phenylene ether), poly(2,6-dimethoxy-1,4-phenylene ether), poly(2,6-diethoxy-1,4-phenylene ether), poly(2-methoxy-6-ethoxy-1,4-phenylene ether), poly(2-ethyl-6-stearyloxy-1,4-phenylene ether), poly(2-methyl-6-phenyl-1,4-phenylene ether), poly(2-methyl-1,4-phenylene ether), poly(2-ethoxy-1,4-phenylene ether), poly(2-chloro-1,4-phenylene ether), poly(3-methyl-6-t-butyl-1,4-phenylene ether), poly(2,6-dichloro-1,4-phenylene ether), poly(2,5-dibromo-1,4-phenylene ether), poly(2,6-dibenzyl-1,4-phenylene ether), and various copolymers having plural kinds of recurring units constituting these polymers. The copolymers also include copolymers formed between poly-substituted phenols such as 2,3,6-trimethylphenol, 2,3,5,6-tetramethylphenol and the like and 2,6-dimethylphenol, and the like. The "polyphenylene ether resin" referred to in this invention also includes graft-modified products of polyphenylene ether resin prepared by graft-modifying the above-mentioned polyphenylene ether resins with a styrene type monomer such as styrene, α-methylstyrene and the like. Among these polyphenylene ether resins, poly(2,6-dimethyl-1,4- phenylene ether) and 2,6-dimethylphenol/2,3,6-trimethylphenol copolymer are preferable.

Although molecular weight of the polyphenylene ether resin usable in this invention cannot be simply specified because desirable molecular weight varies depending on the purpose, it is usually 0.1 to 0.7 dl/g and preferably 0.2 to 0.6 dl/g, as expressed in terms of intrinsic viscosity measured in chloroform at 30° C.

The process for producing such polyphenylene ether resins is well known and mentioned in, for example, U.S. Pat. Nos. 3,306,874, 3,306,875, and 3,257,357, Japanese Patent Application Kokoku (Post-Exam.) No. 52-17880, Japanese Patent Application Kokai (Laid-Open) No. 50-51197, No. 1-304119, etc.

The term "polyarylene sulfide resin" used in this invention means a polymer constituted of a recurring unit represented by the following general formula:

wherein Ar represents a divalent aromatic residue of which examples include:

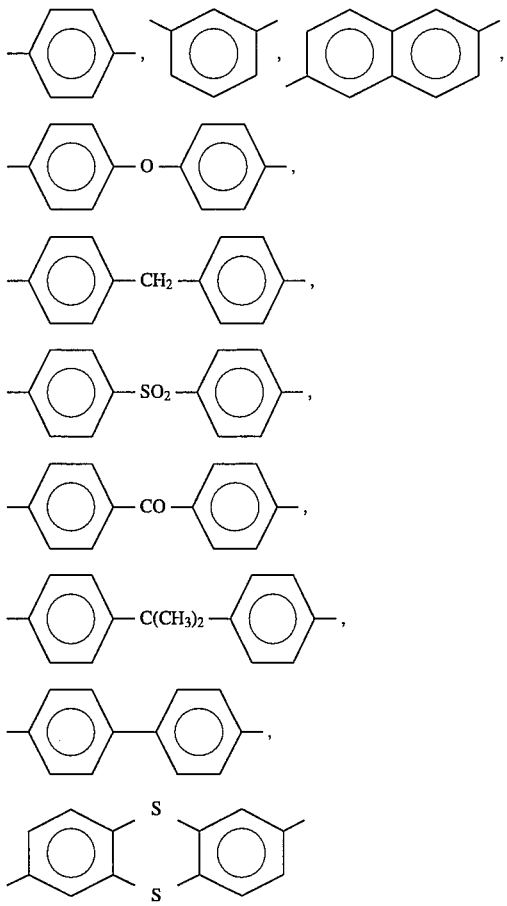

and the like and their substituted derivatives.

Concrete examples of said polyarylene sulfide resin include straight chain type and crosslinked chain type polyphenylene sulfide, poly(1,4-phenylenecarbonyl-1,4-phenylene sulfide), poly(1,4-phenylenesulfonyl-1,4-phenylene sulfide), poly(biphenylene sulfide) and the like. Among them, polyarylene sulfides containing 50% by mole or more of

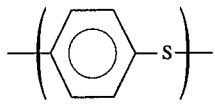

unit are preferable, and polyphenylene sulfide is more preferable.

Although molecular weight of the polyarylene sulfide resin is not critical, it is usually 100 to 50,000 poises and preferably 200 to 10,000 poises, as expressed in terms of melt viscosity at 300° C.

The process for producing said polyarylene sulfide resin is well known, and its examples include processes of reacting a dihalogenated aromatic compound with alkali sulfide in an organic polar solvent (U.S. Pat. No. 2,513,188, Japanese Patent Application Kokoku (Post-Exam.) No. 44-27671, Japanese Patent Application Kokai (Laid-Open) No. 55-43139), etc.

The term "polystyrene type resin" used in this invention means a thermoplastic resin comprising a polymer of an alkenylaromatic hydrocarbon such as styrene, α-methylstyrene, vinyltoluene and the like as its main constituent, and its concrete examples include polystyrene, ABS resin, AS resin, MS resin and the like.

The term "polysulfone resin" used in this invention means an aromatic polymer having group —$SO_2$— in its molecular skeleton, as the polymers mentioned in J. Polym. Sci., Part A-1, Vol. 5, 2375 (1967) have it, and its concrete examples include poly(oxy-1,4-phenylene-2,2-propylidene-1,4-phenyleneoxy-1,4-phenylenesulfonyl-1,4-phenylene), poly(oxy-1,4-phenylenesulfonyl-1,4-phenylene) and the like.

The term "polyketone resin" used in this invention means an aromatic polymer having group —CO— in its main chain, as the polymers mentioned in JMS-Rev. Macromol. Chem. Phy., C27(2), 313 (1987) have it, and its concrete examples include poly(oxy-1,4-phenylenecarbonyl-1,4-phenylene), poly(oxy-1,4-phenyleneoxy-1,4-phenylenecarbonyl-1,4-phenylene) and the like.

The term "polycarbonate resin" used in this invention means an aromatic polymer having group —O—CO—O— in its main chain produced by a condensation reaction between a divalent phenol and phosgen or diphenyl carbonate, and its typical example is poly(oxy-1,4-phenylene-2,2-propylidene-1,4-phenyleneoxycarbonyl).

The term "polyester resin" used in this invention means a polymer having group —O—CO— in its main chain produced by a condensation reaction of a dicarboxylic acid derivative and a dihydric alcohol or a dihydric phenol or by a self-condensation reaction of an oxycarboxylic acid, and its concrete examples include polyethylene terephthalate, polybutylene terephthalate, polyethylene naphthalate, polyarylate and the like.

Among these "other thermoplastic resins", polyphenylene ether resins, polyarylene sulfide resins and polystyrene type resins are preferable.

The term "functional compound (B)" used in this invention means an organic compound having one or more bonds or one or more functional groups selected from the group consisting of non-aromatic carbon-carbon double or triple bonds, oxirane groups and substituted carboxyl groups.

In this invention, the functional compound having only one or more non-aromatic carbon-carbon double or triple bonds includes the following olefins, liquid diene polymers and quinones.

Thus, concrete examples of such a functional compound include olefins such as dodecene-1, octadecene-1 and the like; liquid diene polymers such as liquid polybutadiene; and quinones such as 1,2- and 1,4-benzoquinones, 2,6-dimethylbenzoquinone, 2,6-diphenylbenzoquinone, tetramethylbenzoquinone, 2-chloro-1,4-benzoquinone, chloranil, 2,2'- and 4,4'-diphenoquinones, 1,2-, 1,4- and 2,6-naphthoquinones, 9,10-anthraquinone and the like.

In this invention, concrete examples of the functional compound having only one or more oxirane groups include epoxy resins produced by a condensation reaction of epichlorohydrin and a compound selected from the group consisting of polyhydric phenols, polyhydric alcohols and amines; epoxides of the above-mentioned liquid diene polymers; and epoxy compounds exemplified by oxidized polyolefin wax, octadecyl glycidyl ether, 1-hexadecene oxide and the like.

In this invention, examples of the functional compound having only one or more substituted carboxyl groups include the following compounds. As used herein, the term "substituted carboxyl group" means groups represented by the following formulas which are all derived from a carboxyl group:

—COOR$_1$

—COX

—CONR$_2$R$_3$

—CO—Y—CO— wherein R$_1$ represents hydrogen atom or an alkyl or aryl group having 1–20 carbon atoms optionally having one or more inactive substituents, X represents halogen atom, R$_2$ and R$_3$ each represents hydrogen atom or an alkyl or aryl group having 1–10 carbon atoms optionally having one or more inactive substituents, and Y represents oxygen atom or NH.

Concrete examples of such functional compounds include carboxylic acid derivatives exemplified by succinic anhydride, maleic anhydride polymers such as polymaleic anhydride, styrene-maleic anhydride copolymer and the like, methyl p-nitrobenzoate, p-cyanophenylacetamide and the like.

As the functional compound (B) of this invention, functional compounds simultaneously having (i) at least one bond or functional group selected from the group consisting of non-aromatic carbon-carbon multiple bonds, oxirane groups and substituted carboxyl groups and (ii) at least one functional group selected from the group consisting of substituted carboxyl groups, substituted hydroxyl groups, substituted amino groups, substituted silyl groups, substituted mercapto groups, substituted sulfonic acid groups and oxirane groups, provided that the functional group of (ii) differs from the functional group of (i), are preferred.

As used herein, the term "substituted hydroxyl group" means groups represented by the following general formulas which are all derived from a hydroxyl group:

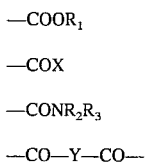

—OR$_4$    —OCR$_5$    —OSi(R$_6$)$_3$ wherein R$_4$ and R$_5$ each represents hydrogen atom or an alkyl or aryl group having 1–10 carbon atoms optionally having one or more inactive substituents, and R$_6$ in number of 3 each represents identical or different alkyl, aryl or alkoxy group having 1–10 carbon atoms optionally having one or more inactive substituents.

The term "substituted amino group" means groups represented by the following general formulas which are all derived from an amino group:

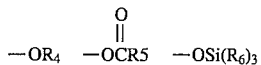

—NHR$_7$    —NHCR$_8$ wherein R$_7$ represents hydrogen atom, cyano group or an alkyl or aryl group having 1–10 carbon atoms optionally having one or more inactive substituents, and R$_8$ represents hydrogen atom or an alkyl or aryl group having 1–20 carbon atoms optionally having one or more inactive substituents.

The term "substituted silyl group" means groups represented by the following general formula which are derived from a silyl group:

—Si(R$_9$)$_3$ wherein R$_9$ in number of 3 each represents identical or different hydrogen atom, or an alkyl, aryl or alkoxy group having 1–10 carbon atoms optionally having one or more amino groups or mercapto groups.

The term "substituted mercapto group" means groups represented by the following general formulas which are all derived from a mercapto group:

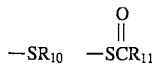

—SR$_{10}$    —SCR$_{11}$ wherein R$_{10}$ and R$_{11}$ each represents hydrogen atom or an alkyl or aryl group having 1–10 carbon atoms optionally having one or more inactive substituents.

The term "substituted sulfonic acid group" means groups represented by the following general formulas which are all derived from a sulfonic acid group:

—SO$_3$R$_{12}$    —SO$_2$X    —SO$_2$NR$_{13}$R$_{14}$ wherein R$_{12}$ represents hydrogen atom or an alkyl or aryl group having 1–20 carbon atoms optionally having one or more inactive substituents, X represents a halogen atom, and R$_{13}$ and R$_{14}$ each represents hydrogen atom or an alkyl or aryl group having 1–10 carbon atoms optionally having one or more inactive substituents.

Examples of such preferable functional compounds include unsaturated dicarboxylic acids exemplified by maleic acid, fumaric acid, chloromaleic acid, Hymic acid, citraconic acid, itaconic acid and the like; unsaturated monocarboxylic acids exemplified by acrylic acid, butenoic acid, crotonic acid, vinylacetic acid, methacrylic acid, pentenoic acid, dodecenoic acid, linoleic acid, angelic acid, cinnamic acid and the like; acid anhydrides of the above-mentioned unsaturated dicarboxylic acids and unsaturated monocarboxylic acids exemplified by maleic anhydride, Hymic anhydride, acrylic anhydride and the like; acid amides of the above-mentioned unsaturated dicarboxylic acids and unsaturated monocarboxylic acids exemplified by maleic acid amide, maleic acid hydrazide, acrylamide, N-(hydroxymethyl)acrylamide and the like; esters of the above-mentioned unsaturated dicarboxylic acids and unsaturated monocarboxylic acids exemplified by ethyl maleate and the like; imides of the above-mentioned unsaturated dicarboxylic acids and unsaturated monocarboxylic acids exemplified by maleimide and the like; unsaturated epoxy compounds exemplified by allyl glycidyl ether, glycidyl acrylate, glycidyl methacrylate and the like; unsaturated amines exemplified by allylamine, p-aminostyrene, N-vinylaniline and the like; unsaturated alcohols exemplified by allyl alcohol, 3-buten-2-ol, propargyl alcohol and the like; alkenylphenols exemplified by p-vinylphenol, 2-propenylphenol and the like; organosilane compounds exemplified by 2-(3-cyclohexenyl)-ethyltrimethoxysilane, 1,3-divinyltetraethoxysilane, vinyltris(2-methoxyethoxy)-silane, 5-(bicycloheptenyl)triethoxysilane, γ-aminopropyltriethoxysilane, γ-mercaptopropyltrimethoxysilane and the like; mercapto compounds such as 3-mercaptoproptonic acid, 2-mercaptobenzimidazole and the like; oxycarboxylic acid derivatives such as 2-hydroxyisobutyric acid, citric acid, malic acid, agaricic acid, calcium citrate, calcium malate, potassium citrate, potassium malate, acetyl citrate, stearyl citrate, distearyl citrate, acetyl maleate, stearyl maleate, N,N'-diethylcitric acid amide, N,N'-dipropylcitric acid amide, N-phenylcitric acid amide, N-dodecylcitric acid amide, N,N'-didodecylcitric acid amide, N-dodecylmalic acid amide and the like; acid halides such as trimellitic anhydride acid halide, chloroformylsuccinic acid, chloroformylsuccinic anhydride, chloroformylglutaric acid, chloroformylglutaric anhydride, chloroacetylsuccinic anhydride and the like; etc.

More preferable functional compounds are compounds simultaneously having (i) non-aromatic carbon-carbon multiple bond(s) and (ii) at least one functional group selected from the group consisting of the above-mentioned substituted carboxyl groups, substituted hydroxyl groups, substituted amino groups, substituted silyl groups, substituted mercapto groups and oxirane groups, and the above-mentioned oxycarboxylic acid derivatives. Among them, more preferable functional compounds are maleic acid, fumaric acid, acrylic acid, methacrylic acid, maleic anhydride, Hymic anhydride, glycidyl methacrylate, glycidyl acrylate, acrylamide, maleimide, allylamine, allyl alcohol, propargyl alcohol, citric acid and maleic acid; and the most preferable functional compounds are maleic anhydride, Hymic anhydride, malic acid, citric acid and fumaric acid.

In some cases, the functional compounds (B) of this invention give a more successful result when used in combination with an alkenyl-aromatic hydrocarbon such as styrene, α-methylstyrene and the like.

As used in this invention, the term "polar compound (C)" means a low molecular weight organic compound or a high molecular weight organic compound having, in one molecule, one or more polar groups selected from the group consisting of substituted carboxyl groups, substituted hydroxyl groups, substituted amino groups, substituted mercapto groups, substituted sulfonic acid groups, oxazoline groups, isocyanato groups and oxirane groups, provided that at least one of said one or more polar groups must be different from at least one of the functional groups of the above-mentioned functional compound (B).

Examples of such polar compound include long chain amines exemplified by cyclohexylamine, octylamine, decylamine, laurylamine, hexadecylamine, stearylamine, eicosanylamine, oleylamine, 4-dodecylaniline and the like; long chain alcohols exemplified by octanol, decanol, lauryl alcohol, hexadecanol, stearyl alcohol, diethylene glycol monododecyl ether and the like; long chain mercaptans exemplified by laurylmercaptan, octadecylmercaptan and the like; long chain isocyanates exemplified by octyl isocyanate, lauryl isocyanate, octadecyl isocyanate and the like; long chain epoxy compounds exemplified by 4-nonylphenyl glycidyl ether, dodecyl glycidyl ether, octadecyl glycidyl ether, behenyl glycidyl ether, 1-octadecene oxide, 1-eicosene oxide and the like; long chain carboxylic acids exemplified by hexanoic acid, octanoic acid, octenoic acid, dodecanoic acid, stearic acid, linoleic acid, linolenic acid, ricinoleic acid, oleic acid, octacosanoic acid and the like; long chain acid amides such as dodecanoic acid amide, stearamide and the like; long chain sulfonic acid exemplified by laurylbenzenesulfonic acid and the like; etc.

As the polar compound (C) of this invention, organic compounds having, in one molecule, two or more polar groups selected from the group consisting of substituted carboxyl groups, substituted hydroxyl groups, substituted amino groups, substituted mercapto groups, substituted sulfonic acid groups, oxazoline groups, isocyanato groups and oxirane groups are preferable, provided that at least one of said two or more polar groups must be different from at least one of the functional groups of the above-mentioned functional compound (B).

Concrete examples of such preferable polar compounds include aromatic polycarboxylic acids such as terephthalic acid, isophthalic acid, phthalic acid, p-carboxyphenylacetic acid, p-phenylenediacetic acid, n-phenylenediglycolic acid, diphenyldiacetic acid, diphenyl-p,p'-dicarboxylic acid, diphenyl-m,m'-dicarboxylic acid, diphenyl-4,4'-diacetic acid, diphenylnethane-p,p'-dicarboxylic acid, diphenylethane-p,p'-dicarboxylic acid, stilbenedicarboxylic acid, benzophenone-4,4'-dicarboxylic acid, naphthalene-1,4-dicarboxylic acid, naphthalene-1,5-dicarboxylic acid, naphthalene-2,6-dicarboxylic acid, p-carboxyphenoxyacetic acid, trimellitic acid, pyromellitic acid and the like; aliphatic polycarboxylic acids such as oxalic acid, succinic acid, adipic acid, cork acid, azelaic acid, sebacic acid, dodecanedicarboxylic acid, undecanedicarboxylic acid and the like; acid anhydrides of the above-mentioned aromatic and aliphatic polycarboxylic acids; polyhydric alcohols such as ethylene glycol, propylene glycol, trimethylene glycol, butane-1,4-diol, 2,2-dimethylpropane-1,3-diol, cis-2-butene-1,4-diol, trans-2-butene-1,4-diol, pentamethylene glycol, hexamethylene glycol, heptamethylene glycol, octamethylene glycol, decamethylene glycol, glycerine, trimethylolpropane, pentaerythritol, m-xylylene diol, p-xylylene diol and the like; polyhydric phenols such as hydroquinone, resorcin, catechol, 4,4'-dihydroxybiphenyl, 4,4'-dihydroxydiphenyl ether, Bisphenol A, Bisphenol S, Bisphenol F, pyrogallol, phloroglucin and the like; aliphatic polyamines such as ethylenediamine, propylenediamine, diaminobutane, diaminopentane, 2-methylpentamethylenediamine, hexamethylenediamine, p-xylylenediamine, m-xylylenediamine, tris(3-aminopropyl)amine and the like; aromatic polyamines such as p-phenylenediamine, m-phenylenediamine, tolylenediamine, 4,4'-diaminodiphenylmethane, 4,4'-diaminodiphenyl ether, 4,4'-diaminodiphenyl sulfide, 3,3'-diaminodiphenyl sulfone and the like; polycyanamides such as 4,4'-dicyanamidodicyclohexylmethane, 4,4'-dicyanamidodiphenyl ether, 2,2'-bis(4-(4-cyanamidophenoxy)-phenyl)propane, hexamethylenedicyanamide, dodecamethylenedicyanamide and the like; bisoxazolines such as 2,2'-bis(2-oxazoline), 2,2'-p-phenylenebis(2-oxazoline), 2,2'-m-phenylenebis(2-oxazoline), 2,2'-o-phenylenebis(2-oxazoline), 2,2'-ethylenebis(2-oxazoline), 2,2'-tetramethylenebis(2-oxazoline) and the like; polyisocyanates such as 1,12-dodecane diisocyanate, hexamethylene diisocyanate, m-phenylene diisocyanate, 2,4-toluylene diisocyanate, 2,6-toluylene diisocyanate, 4,4'-diphenylmethane diisocyanate, 1,4-cyclohexane diisocyanate, 4,4'-dicyclohexylmethane diisocyanate and the like; polymercaptans such as ethanedithiol, 1,4-butanedithiol, trithioglycerine, dithiocatechol, dithioresorcin, dithioquinol, trithiophloroglucin and the like; polyepoxides such as Bisphenol A diglycidyl ether, terephthalic acid diglycidyl ester, triglycidyl isocyanurate The polar compounds (C) used in this invention are not limited to the above, but compounds having two or more kinds of polar groups in one molecule such as aminocarboxylic acids exemplified by aminobenzoic acids, aminobenzoic esters and the like, hydroxycarboxylic acids exemplified by 12-hydroxydodecanoic acid and the like, mercaptocarboxylic acids; aminoalcohols exemplified by monoethanolamine, diethanolamine and the like; aminophenols exemplified by hydroxyaniline and the like; reaction products between the above-mentioned polar compounds, etc. are also usable as preferable polar compounds.

Among these compounds, more preferable polar compounds are carboxylic acid derivatives such as adipic acid, sebacic acid, terephthalic acid, isophthalic acid, phthalic anhydride, trimellitic anhydride, pyromellitic anhydride and the like; diamines such as phenylenediamines, xylylenediamines, alkylenediamines and the like; diisocyanates such as hexamethylene diisocyanate, diphenylmethane diisocyanate and the like; and diepoxides, and most preferable polar compounds are diamines and diisocyanates.

When a resin composition having a more enhanced impact strength is required in this invention, it is desirable to incorporate an elastomer into the composition.

Examples of said elastomer include natural rubber, polybutadiene rubber, polyisoprene rubber, butyl rubber, ethylene-propylene copolymer rubber, butadiene-styrene copolymer rubber, butadiene-acrylonitrile copolymer rubber, hydrogenated and non-hydrogenated styrene-conjugated diene block copolymer rubber, polyester rubber, acrylic rubber, silicone rubber and the like and their modified products.

Among them, preferable elastomers are diene-copolymerized terpolymers, ethylene-propylene copolymer rubbers containing a graft copolymer prepared by graft copolymerizing an unsaturated monomer such as styrene and the like, and styrene-conjugated diene block copolymer rubbers such as styrene-isoprene diblock copolymer, styrene-butadiene triblock copolymer and the like including hydrogenated products thereof such as partially hydrogenated products thereof, too.

In the resin composition of this invention, the thermoplastic resin (A) comprises the above-mentioned polyolefin resin as an indispensable ingredient. Although proportion of the polyolefin resin to thermoplastic resin (A) may be arbitrarily selected, it is usually 1% by weight or above and preferably 5 to 100% by weight, based on the weight of thermoplastic resin (A). Although proportion of the above-mentioned "other thermoplastic resin" which thermoplastic resin (A) can comprise is not critical, it is usually 1 to 99% by weight and preferably 1 to 95% by weight, on the same basis as above.

The thermoplstic resin (A) can comprise the above-mentioned elastomer, if it is desired. Proportion of the elastomer is usually 70% by weight or below and preferably 1 to 50% by weight, based on the weight of thermoplastic resin (A) including the elastomer.

In the resin composition of this invention, the effects brought about by the functional compound (B) and polar compound (C) vary not only depending on the kinds of themselves but also depending on the selected composition and formulation of thermoplastic resin (A). Accordingly, preferable ranges of the quantities of functional compound (B) and polar compound (C) cannot be specified simply. However, per 100 parts by weight of thermoplastic resin (A), the quantity of functional compound (B) is usually 0.1 to 30 parts by weight and preferably 0.2 to 20 parts by weight, and the quantity of polar compound (C) is usually 0.001 to 20 parts by weight and preferably 0.02 to 10 parts by weight.

The resin composition of this invention can be produced by melting and kneading thermoplastic resin (A) comprising the above-mentioned polyolefin resin and optionally the above-mentioned other thermoplastic resin and optionally the above-mentioned elastomer together with the above-mentioned functional compound (B), and thereafter mixing thereinto the above-mentioned polar compound (C) and optionally the above-mentioned elastomer and optionally other substances mentioned later. Herein, as the method for the melting and kneading, various hitherto known methods can be adopted. For example, the above-mentioned ingredients are mixed together by means of known mixing means conventionally used for mixing together a resin and another resin or a resin and a liquid or solid additive, such as Henschel mixer, Supermixer, ribbon blender, V blender and the like to prepare a uniform mixture, after which the mixture is kneaded by the use of a kneading means such as Banbury mixer, Plastomill, Brabender Plastograph, single or twin screw extruder or the like.

Temperature of the kneading is selected from a range of 150° to 400° C. and preferably 200° to 350° C. It is sometimes preferable to carry out the kneading in the presence of a radical generator, in order to obtain a more uniform resin composition.

Examples of said radical generator include halogenated imides such as N-bromosuccinimide and the like, organic peroxides such as benzoyl peroxide, dicumyl peroxide, di-t-butyl peroxide, cumene hydroperoxide, 2,5-dimethyl-2,5-di(peroxybenzoate)-hexine-3, 1,3-bis(t-butylperoxyisopropyl)-benzene, lauroyl peroxide, t-butyl peracetate and the like, persulfates such as potassium persulfate, ammonium persulfate and the like, diazo compounds such as azobisisobutyronitrile, 1,1'-azobis(cyclohexanecarbonitrile) and the like, etc.

When such a radical generator is used, its amount is usually 10 parts by weight or less and preferably 0.001 to 5 parts by weight, per 100 parts by weight of thermoplastic resin (A).

In producing the resin composition of this invention, the polar compound (C) must be mixed after the thermoplastic resin (A) and functional compound (B) have formed at least apparently uniform molten mixture. Although the method of mixing at this time is not critical, the above-mentioned melting and kneading is preferable.

As preferable concrete embodiments of the production of the resin composition of this invention, the followings can be referred to. Thus, according to Embodiment (1), a thermoplastic resin (A), a functional compound (B), optionally an elastomer and optionally a radical generator are melted and kneaded by the use of a twin screw extruder to produce a formed product such as pellet. After once isolating the formed product, it is compounded with a polar compound (C) and optionally an elastomer and optionally other substances mentioned later, and the resulting mixture is melted and kneaded by the use of a twin screw extruder. According to Embodiment (2), an extruder equipped with an upstream feeder and a downstream feeder is used. From the upstream feeder, a thermoplastic resin (A), a functional compound (B), optionally an elastomer and optionally a radical generator are continuously fed at a predetermined rate. From the downsteam feeder, a polar compound (C), optionally an elastomer and optionally other substances mentioned later are continuously fed at a predetermined rate. While feeding them, the mixed material is melted, kneaded and extruded.

If desired, the resin composition of this invention may contain a wide variety of substances other than the above. Examples of said "other substances" which are added for particular purposes include other resins, flame retardant, stabilizer, plasticizer, lubricant, pigment, reinforcing fiber, filler, etc. Said "other resins" means thermoplastic resins such as the above-mentioned polyolefin resins, the above-mentioned other thermoplastic resins, polyamides (nylon-6, nylon-66, nylon-12 and the like), polyamideimides, polyacrylic esters (polymethyl methacrylate and the like) and polyvinyl halides (polyvinyl chloride, polyvinylidene chloride and the like), and they are thermoplastic resins other than the thermoplastic resins constituting the thermoplastic resin (A) of this invention as member(s) of it. The "other resin" used may be the same resin as the ingredient constituting the thermoplastic resin (A).

Examples of the flame retardant include phosphoric esters exemplified by triphenyl phosphate, tricresyl phosphate, a phosphate obtained from isopropyl phenol and a phenol mixture, a phosphate obtained from a mixture consisting of a bifunctional phenol such as benzohydroquinone or Bisphenol A and other alcohol or phenol, and the like; brominated compounds exemplified by decabromobiphenyl, pentabromotoluene, decabromodiphenyl ether, hexabromobenzene, brominated polystyrene, brominated epoxy resin and the like; nitrogen-containing compounds such as melamine, melamine triisocyanurate and the like; and inorganic substances such as red phosphorus, antimony trioxide, boron oxide and the like.

Concrete examples of the reinforcing fiber include inorganic fibers such as glass fiber, potassium titanate fiber, rock wool, carbon fiber and the like; organic fibers such as aromatic polyamide fiber, polybenzimidazole fiber and the like;and metallic fibers such as brass fiber, aluminum-zinc fiber and the like.

Concrete examples of the filler include inorganic fillers such as glass beads, milled glass fiber, asbestos, wallastnite, mica, talc, clay, calcium calcium, magnesium hydroxide, silica, diatomaceous earth and the like, metallic fillers such as aluminum flake, zinc flake and the like; and organic fillers such as polyimide powder and the like.

As concrete examples of the stabilizer, sterically hindered phenol, organic phosphites, oxalic acid diazides, sterically hindered amines and the like can be referred to. As concrete examples of the pigment, titanium oxide, zinc sulfide and the like can be referred to. As concrete examples of the lubricant, polyethylene wax, paraffin and the like can be referred to.

The above-mentioned "other substances" may be used at any formulation in accordance with purpose. As a rough measure in its general use, however, said other resin is used in an amount of 500 parts by weight or less, said flame retardant is used in an amount of 30 parts by weight or less and preferably 1 to 20 parts by weight, said stabilizer is used in an amount of 20 parts by weight or less and preferably 0.001 to 10 parts by weight, said reinforcing fiber and filler are used both in an amount of 100 parts by weight or less and preferably 0.1 to 80 parts by weight, and said lubricant is used in an amount of 2 parts by weight or less, all per 100 parts by weight of thermoplastic resin (A).

Next, this invention will be illustrated in more detail with reference to examples. This invention is by no means limited by these examples.

In the examples, Izod impact strength (3.2 mm in thickness, norcned), tensile properties and flexural properties were measured at 23° C. on test pieces prepared by injection molding according to ASTM D256, ASTM D638 and ASTM D790.

EXAMPLE 1

Mixture A was prepared by mixing by the use of Supermixer 100 parts by weight of a polypropylene (Sumitomo Noblen WF299B, manufactured by Sumitomo Chemical Co., Ltd., MFR 1.2 g/10 minutes), 2 parts by weight of maleic anhydride and 1 part by weight of a radical generator composition prepared by dispersing 1,3-bis(t-butylperoxyisopropyl)-benzene into polypropylene up to a concentration of 8% by weight.

Mixture A was extruded by the use of a 50 mm twin screw kneading extruder (TEM-50, manufactured by Toshiba Kikai K. K.) at a barrel temperature of 230° C., and the extruded strand was pelletized.

Then, 100 parts by weight of the pellet and 1 part by weight of hexamethylenediamine were mixed together, and the resulting mixture was extruded by the use of the above-mentioned twin screw kneading extruder at a barrel temperature of 230° C. The extruded strand was pelletized to obtain a resin composition of this invention.

The composition had a flexural modulus of 16,000 kg/cm$^2$ and an Izod impact strength of 4.6 kg·cm/cm.

COMPARATIVE EXAMPLE 1

A pelletized resin composition was prepared by repeating the procedure of Example 1, except that no hexamethylenediamine was used.

The resin composition had a flexural modulus of 15,800 kg/cm$^2$ and an Izod impact strength of 3.0 kg·cm/cm.

EXAMPLES 2–11 AND COMPARATIVE EXAMPLE 2

A pellet of Mixture A was prepared by mixing 85, 1 and 1 part(s) by weight, respectively, of the same polypropylene, maleic anhydride and radical generator composition as in Example 1 together with 15 parts by weight of ethylene-propylene copolymer rubber (Esprene Elllp, manufactured by Sumitomo Chemical Co., Ltd.) and 2 parts by weight of styrene and extruding the mixture in the same manner as in Example 1.

Then, 100 parts by weight of the pellet and 1 part by weight of the polar compound shown in Table 1 were mixed together and the resulting mixture was extruded by the use of the above-mentioned twin screw kneading extruder at a barrel temperature of 240° C. The extruded strand was pelletized to obtain a resin composition of this invention.

Flexural modulus and Izod impact strength of the compositions are shown in Table 1.

REFERENTIAL EXAMPLE 1

Eighty parts by weight of polypropylene (MFR 0.7 g/10 minutes, Sumitomo Noblen D501, manufactured by Sumitomo Chemical Co., Ltd.), 20 parts by weight of poly(2,6-dimethyl-1,4-phenylene ether) (PPE H-46, manufactured by Nippon Polyether K. K.), 1 part by weight of maleic anhydride, 2 parts by weight of styrene and 1 part of the same radical generator composition as in Example 1 were mixed together by the use of Supermixer, and the resulting mixture was extruded by the same twin screw kneading extruder as in Example 1 at a barrel temperature of 260° C. The extruded strand was pelletized to obtain a pelletized composition. It was named preliminary kneaded product M-1.

REFERENTIAL EXAMPLE 2

One hundred parts by weight of the same polypropylene as in Referential Example 1, 1 part by weight of maleic anhydride, 2 parts by weight of styrene and 1 part by weight of the same radical generator composition as in Example 1 were mixed together by the use of Supermixer, and the resulting mixture was extruded by the use of the same twin screw kneading extruder as in Example 1 at a barrel temperature of 230° C. The extruded strand was pelletized to obtain a pelletized composition. It was named preliminary kneaded product M-2.

REFERENTIAL EXAMPLE 3

One hundred parts by weight of the same poly(2,6-dimethyl-1,4-phenylene ether) as in Referential Example 1, 1 part by weight of maleic anhydride, 2 parts by weight of styrene and 1 part by weight of the same radical generator composition as in Example 1 were mixed together by the use of Supermixer, and the resulting mixture was extruded by the use of the twin screw kneading extruder of Example 1 at a barrel temperature of 300° C. The extruded strand was pelletized to obtain a pelletized composition. It was named preliminary kneaded product M-3.

EXAMPLE 12

One hundred parts by weight of the preliminary kneaded product M-1 obtained in Referential Example 1 was mixed with 1.2 parts by weight of hexamethylenediamine, and the resulting mixture was extruded by the use of the twin screw kneading extruder of Example 1 at a barrel temperature of 260° C. The extruded strand was pelletized to obtain a composition of this invention.

The composition had a tensile elongation, a flexural modulus and an Izod impact strength of 350%, 17,500 kg/cm$^2$ and 4.8 kg·cm/cm, respectively.

COMPARATIVE EXAMPLE 3

Eighty parts by weight of the preliminary kneaded product M-2 obtained in Referential Example 2, 20 parts by weight of the preliminary kneaded product obtained in Referential Example 3 and 1.2 parts by weight of hexamethylenediamine were extruded in the same manner as in Example 12 to obtain a pellet of a resin composition.

Its tensile elongation, flexural modulus and Izod impact strength were 82%, 16,800 kg/cm$^2$ and 3.2 kg·cm/cm, respectively.

EXAMPLE 13

The procedure of Example 12 was repeated, except that the hexamethylenediamine was replaced with 1,12-dodecane diisocyanate. Thus, a resin composition of this invention was obtained.

Tensile elongation, flexural modulus and Izod impact strength of the composition were 430%, 17,600 kg/cm$^2$ and 5.0 kg·cm/cm, respectively.

REFERENTIAL EXAMPLE 4

Fifty six parts by weight of polypropylene having an MFR of 0.7 g/10 minutes (Sumitomo Noblen D501, manufactured by Sumitomo Chemical Co., Ltd.), 24 parts by weight of poly(2,6-dimethyl-1,4-phenylene ether) (PPE H-40 manufactured by Nippon Polyether K. K.), 20 parts by weight of the same ethylene-propylene copolymer rubber as in Example 2, 0.91 part by weight of maleic anhydride, 2.1 parts by weight of styrene and 1 part by weight of the same radical generator composition as in Example 1 were mixed together by the use of Supermixer, and the resulting mixture was extruded by the use of the twin screw kneading extruder of Example 1 at a barrel temperature of 260° C. The extruded strand was pelletized to obtain a pelletized composition. It was named preliminary kneaded product M-4.

REFERENTIAL EXAMPLES 5–9

Seventy parts by weight of the same polypropylene as in Referential Example 4, 30 parts by weight of the same poly(2,6-dimethyl-1,4-phenylene ether) as in Referential Example 4, 2 parts by weight of styrene, 1 part by weight of the same radical generator composition as in Example 1 and the functional compound shown in Table 2 of which amount was varied as shown in Table 2 were mixed together by the use of Supermixer, and each of the resulting mixture was extruded by the use of the twin screw kneading extruder of Example 1 at a barrel temperature of 260° C. The extruded strand was pelletized to obtain a pelletized composition. The compositions thus obtained were named as shown in Table 2.

REFERENTIAL EXAMPLE 10

One hundred parts by weight of the same polypropylene as in Referential Example 4, 1 part by weight of maleic anhydride, 2 parts by weight of styrene and 1 part by weight of the same radical generator composition of Example 1 were mixed together by the use of Supermixer, and the resulting mixture was extruded by the use of the twin screw kneading extruder as in Example 1 at a barrel temperature of 230° C. The extruded strand was pelletized to obtain a pelletized composition. It was named preliminary kneaded product M-10.

REFERENTIAL EXAMPLE 11

One hundred parts by weight of the same poly(2,6-dimethyl-1,4-phenylene ether) as in Referential Example 4, 1 part by weight of maleic anhydride and 1 part by weight of the same radical generator composition as in Example 1 were mixed together by the use of Supermixer, and the resulting mixture was extruded by the use of the twin screw kneading extruder of Example 1 at a barrel temperature of 260° C. The extruded strand was pelletized to obtain a pelletized composition. It was named preliminary kneaded product M-11.

EXAMPLES 14–30

One or two kind(s) of preliminary kneaded product(s) obtained in Referential Examples 4–11, an elastomer and a polar compound, all shown in Table 3, were mixed together at the ratio shown in Table 3. Each of the resulting mixtures was extruded by the use of the twin screw kneading extruder of Example 1 at a barrel temperature of 240° C. The extruded strands were pelletized to obtain resin compositions of this invention.

Tensile elongations and Izod impact strengths of the resin compositions are shown in Table 3.

REFERENTIAL EXAMPLE 12

Seventy parts by weight of a block type propylene copolymer containing about 4% of ethylene component (Sumitomo Noblen AD571, manufactured by Sumitomo Chemical Co., Ltd.), 30 parts by weight of a crosslinked chain type polyphenylene sulfide (T-4, manufactured by Toplen K. K.), 1 part by weight of maleic anhydride, 2 parts by weight of styrene and 1 part by weight of the same radical generator composition as in Example 1 were mixed together by the use of Supermixer, and the resulting mixture was extruded by the use of the twin screw kneading extruder of Example 1 at a barrel temperature of 260° C. The extruded strand was pelletized to obtain a pelletized composition. It was named preliminary kneaded product M-12.

REFERENTIAL EXAMPLE 13

One hundred parts by weight of the same polypropylene copolymer as in Referential Example 12, 1 part by weight of maleic anhydride, 2 parts by weight of styrene and 1 part by weight of the same radical generator composition as in Example 1 were mixed together by the use of Supermixer, and the resulting mixture was extruded by the use of the twin screw kneading extruder of Example 1 at a barrel temperature of 230° C. The extruded strand was pelletized to obtain a pelletized composition. It was named preliminary kneaded product M-13.

REFERENTIAL EXAMPLE 14

One hundred parts by weight of the same polyphenylene sulfide as in Referential Example 12, 1 part by weight of maleic anhydride, 2 parts by weight of styrene and 1 part by weight of the same radical generator composition as in Example 1 were mixed together by the use of Supermixer, and the resulting mixture was extruded by the use of the twin screw kneading extruder of Example 1 at a barrel temperature of 300° C. The extruded strand was pelletized to obtain a pelletized composition. It was named preliminary kneaded product M-14.

EXAMPLE 31

One hundred parts by weight of preliminary kneaded product M-12 obtained in Referential Example 12 was mixed with 1 part by weight of hexamethylenediamine, and the resulting mixture was extruded by the use of the twin screw kneading extruder of Example 1 at a barrel temperature of 240° C. The extruded strand was pelletized to obtain a resin composition of this invention.

Tensile elongation, flexural modulus and Izod impact strength of the composition were 150%, 14,800 kg/cm$^2$ and 8.0 kg·cm/cm, respectively.

COMPARATIVE EXAMPLE 6

Seventy parts by weight of the preliminary kneaded product M-13 obtained in Referential Example 13, 30 parts by weight of the preliminary kneaded product M-14 obtained in Referential Example 14 and 1 part by weight of hexamethylene-diamine were extruded just in the same manner as in Example 31 to obtain a pelletized resin composition.

Tensile elongation, flexural modulus and Izod impact strength of the composition were 38%, 15,100 kg/cm$^2$ and 2.9 kg·cm/cm, respectively.

EXAMPLE 32

A resin composition of this invention was prepared by repeating the procedure of Example 31, except that the hexamethylenediamine was replaced with diphenylmethane diisocyanate.

Tensile elongation, flexural modulus and Izod impact strength of the composition were 110%, 14,200 kg/cm$^2$ and 7.6 kg·cm/cm, respectively.

EXAMPLE 33

A resin composition of this invention was prepared by repeating the procedure of Example 31, except that the hexamethylenediamine was replaced with Bisphenol A diglycidyl ether (Sumiepoxy ELA-128, manufactured by Sumitomo Chemical Co., Ltd.).

Tensile elongation, bending modulus and Izod impact strength of the composition were 96%, 14,300 kg/cm$^2$ and 6.6 kg·cm/cm, respectively.

REFERENTIAL EXAMPLE 15

Twenty parts by weight of the same polypropylene as in Example 1, 80 parts by weight of polystyrene (Esblite 8K, manufactured by Sumitomo Chemical Co., Ltd.), 1 part by weight of maleic anhydride, 2 parts by weight of styrene and 1 part by weight of the same radical generator composition as in Example 1 were mixed together by the use of Supermixer, and the resulting mixture was extruded by the use of the twin screw kneading extruder of Example 1 at a barrel temperature of 220° C. The extruded strand was pelletized to obtain a pelletized composition. It was named preliminary kneaded product M-15.

REFERENTIAL EXAMPLE 16

Seventy parts by weight of the same polypropylene as in Example 1, 30 parts by weight of high-impact polystyrene (Esblite 500HM, manufactured by Sumitomo Chemical Co., Ltd.), 1 part by weight of maleic anhydride, 2 parts by weight of styrene and 1 part by weight of the same radical generator composition as in Example 1 were treated in the same manner as in Referential Example 15 to obtain a pelletized composition. It was named preliminary kneaded product M-16.

EXAMPLE 34

One hundred parts by weight of preliminary kneaded product M-15 and 1 part by weight of hexamethylenediamine were extruded by the use of the twin screw kneading extruder of Example 1 at 230° C. to obtain a resin composition of this invention.

Tensile elongation, flexural modulus and Izod impact strength of the composition were 7%, 25,200 kg/cm$^2$ and 2.3 kg·cm/cm, respectively.

COMPARATIVE EXAMPLE 7

A resin composition was prepared by repeating the procedure of Example 34, except that no hexamethylenediamine was used.

Tensile elongation, bending modulus and Izod impact strength of the composition were 3%, 24,000 kg/cm$^2$ and 0.8 kg·cm/cm, respectively.

EXAMPLE 35

A resin composition was prepared by repeating the procedure of Example 34, except that the preliminary kneaded product was altered to preliminary kneaded product M-16. Tensile elongation, flexural modulus and Izod impact strength of the composition were 56%, 16,100 kg/cm$^2$ and 3.8 kg/cm/cm, respectively.

Owing to its excellent impact strength and economicity, the resin composition of this invention obtained in the above-mentioned manner can be formed by various forming processes such as extrusion, injection molding, blow molding and the like and furnished to the society as a variety of useful resin articles. Thus, this invention has a very high industrial value.

TABLE 1

| No. | Polar compound | Flexural modulus (kg/cm²) | Izod impact strength (kg-cm/cm) |
|---|---|---|---|
| Example 2 | Hexamethylenediamine | 12,000 | 55 |
| Example 3 | 1,4-Diaminobutane | 12,100 | 45 |
| Example 4 | 1,3-Diaminopentane | 12,000 | 46 |
| Example 5 | 2-Methylpentamethylene-diamine | 12,200 | 56 |
| Example 6 | Tris(3-aminopropyl)-amine | 12,000 | 45 |
| Example 7 | Diphenylmethane diisocyanate | 12,300 | 50 |
| Example 8 | Toluylene diisocyanate | 11,900 | 47 |
| Example 9 | 1,4-Cyclohexane diisocyanate | 12,200 | 49 |
| Example 10 | Hexamethylene diisocyanate | 12,000 | 57 |
| Example 11 | Bisphenol A diglycidyl ether | 11,800 | 43 |
|  |  | 11,800 | 43 |
| Comparative Example 2 | — | 11,700 | 39 |

TABLE 2

| No. | Preliminary kneaded product | Functional compound Name | Parts by wt. |
|---|---|---|---|
| Referential Example 5 | M-5 | Maleic anhydride | 1 |
| Referential Example 6 | M-6 | Hymic anhydride | 1.2 |
| Referential Example 7 | M-7 | Fumaric acid | 1.2 |
| Referential Example 8 | M-8 | Citric acid | 1.5 |
| Referential Example 9 | M-9 | Malic acid | 1.5 |

TABLE 3

| No. | Preliminary kneaded product A Name | Parts by wt. | Preliminary kneaded product B Name | Parts by wt. | Elastomer Name | Parts by wt. |
|---|---|---|---|---|---|---|
| Example 14 | M-4 | 100 | — | — | — | — |
| Example 15 | " | " | — | — | — | — |
| Example 16 | " | " | — | — | — | — |
| Example 17 | " | " | — | — | — | — |
| Example 18 | " | " | — | — | — | — |
| Example 19 | M-5 | 80 | — | — | EPR[a] | 20 |
| Example 20 | " | " | — | — | SBS[b] | " |
| Example 21 | " | " | — | — | SEP[c] | " |
| Example 22 | " | " | — | — | SEBS[d] | " |
| Example 23 | M-6 | " | — | — | EPR | " |
| Example 24 | M-7 | " | — | — | " | " |
| Example 25 | M-8 | " | — | — | " | " |
| Example 26 | M-9 | " | — | — | " | " |
| Example 27 | M-5 | 80 | — | — | EPR | 20 |
| Example 28 | " | " | — | — | " | " |
| Example 29 | " | " | — | — | " | " |
| Example 30 | " | " | — | — | " | " |
| Comparative Ex. 4 | M-10 | 56 | M-11 | 24 | " | " |
| Comparative Ex. 5 | M-5 | 80 | — | — | " | " |

| No. | Polar compound Name | Parts by wt. | Tensile elongation (%) | Izod impact strength (kg·cm/cm) |
|---|---|---|---|---|
| Example 14 | Hexamethylenediamine | 1 | 250 | 38 |
| Example 15 | 1,4-Diaminobutane | " | 180 | 26 |
| Example 16 | Hexamethylenediamine carbamate | " | 260 | 39 |
| Example 17 | Diphenylmethane diisocyanate | " | 230 | 32 |
| Example 18 | Hexamethylene diisocyanate | " | 200 | 29 |
| Example 19 | Hexamethylene diamine | " | 200 | 35 |
| Example 20 | " | " | 120 | 15 |
| Example 21 | " | " | 110 | 22 |
| Example 22 | " | " | 230 | 20 |
| Example 23 | " | " | 250 | 34 |
| Example 24 | " | " | 190 | 28 |
| Example 25 | " | " | 130 | 26 |
| Example 26 | " | " | 110 | 25 |
| Example 27 | Stearylamine | 2 | 120 | 14 |
| Example 28 | Palmitic acid chloride | " | 115 | 11.5 |

TABLE 3-continued

| | | | | |
|---|---|---|---|---|
| Example 29 | Lunrylbenenenesulfonyl chloride | " | 118 | 11.5 |
| Example 30 | Octadacyl isocyanate | " | 125 | 13 |
| Comparative Ex. 4 | Hexamethylenediamine | 1 | 96 | 2.5 |
| Comparative Ex. 5 | — | — | 32 | 4.6 |

Notes)
a)Ethylene-propylene copolymer rubber (Esprene E111P, manufacutred by Sumitomo Chemical Co., Ltd.)
b)Styrene-butadiene-styrene block copolymer rubber (Kaliflex TR1101, manufacutred by Shell Chemical Co.)
c)Partially hydrogenated styrene-isoprene block copolymer rubber (Kraton G-1701, manufactured by Shell Chemical Co.)
d)Partially hydrogenated styrene-butadiene-styrene block copolymer rubber (Kraton G-1651, manufactured by Shell Chemical Co.)

What is claimed is:

1. A process for producing a resin composition which comprises melting and kneading (A) a thermoplastic resin comprising a polyolefin resin together with (B) a functional compound having one or more bonds or one or more functional groups selected from the group consisting of non-aromatic carbon-carbon multiple bonds, oxirane groups and substituted carboxyl groups and subsequently mixing thereinto (C) a polar compound having one or more polar group(s) selected from the group consisting of substituted carboxyl groups, substituted hydroxyl groups, substituted amino groups, substituted mercapto groups, oxazoline groups, isocyanato groups and oxirane groups, provided that at least one of the polar groups is different from at least one of the functional groups of the functional compound (B).

2. A process for producing a resin composition according to claim 1, wherein said polar compound (C) is a polar compound having, in one molecule, two or more polar groups selected from the group consisting of substituted carboxyl groups, substituted hydroxyl groups, substituted amino groups, substituted mercapto groups, oxazoline groups, isocyanato groups and oxirane groups.

3. A process for producing a resin composition according to claim 1, wherein said functional compound (B) is a functional compound simultaneously having (i) at least one bond or functional group selected from the group consisting of non-aromatic carbon-carbon multiple bonds, oxirane groups and substituted carboxyl groups and (ii) at least one functional group selected from the group consisting of substituted carboxyl groups, substituted hydroxyl groups, substituted amino groups, substituted silyl groups, substituted mercapto groups and oxirane groups which is different from the functional groups of (i).

4. A process for producing a resin composition according to claim 1, wherein said thermoplastic resin is a resin mixture comprising a polyolefin resin and other thermoplastic resin.

5. A process for producing a resin composition according to claim 1, wherein the melting and kneading are carried out in the presence of a radical generator.

6. A process for producing a resin composition according to claim 1, wherein the melting and kneading are carried out at a temperature of 150° to 400° C.

7. A process for producing a resin composition which comprises melting and kneading (A) a resin mixture comprising 1 to 99% by weight of a polyolefin resin and at least one member selected from the group consisting of a polyphenylene ether, a polyarylene sulfide and an ethylene-propylene copolymer together with (B) a functional compound simultaneously having (i) at least one bond or functional group selected from the group consisting of non-aromatic carbon-carbon multiple bonds, oxirane groups and substituted carboxyl groups and (ii) at least one functional group selected from the group consisting of substituted carboxyl groups, substituted hydroxyl groups, substituted amino groups, substituted silyl groups, substituted mercapto groups, substituted sulfonic acid groups and oxirane groups which is different from the groups of (i), and subsequently mixing thereinto 70% by weight or below of an elastomer based on 100% by weight of the resin mixture (A) and (C) a polar compound having, in one molecule, one or more polar groups selected from the group consisting of substituted carboxyl groups, substituted hydroxyl groups, substituted amino groups, substituted mercapto groups, substituted sulfonic acid groups, oxazoline group, isocyanato groups and oxirane groups, provided that at least one of the polar groups of (C) is different from at least one of the functional groups of the functional compound (B), wherein the quantity of the functional compound (B) is 0.2 to 20 parts by weight and the quantity of the polar compound (C) is 0.02 to 10 parts by weight per 100 parts by weight of the resin mixture (A).

8. A process for producing a resin composition according to claim 7, wherein the melting and kneading are carried out in the presence of a radical generator.

9. A process for producing a resin composition according to claim 7, wherein the melting and kneading are carried out at a temperature of 150° to 400° C.

* * * * *